US008467770B1

(12) United States Patent
Ben Ayed

(10) Patent No.: US 8,467,770 B1
(45) Date of Patent: Jun. 18, 2013

(54) SYSTEM FOR SECURING A MOBILE TERMINAL

(76) Inventor: Mourad Ben Ayed, Cupertino, CA (US)

( * ) Notice: Subject to any disclaimer, the term of this patent is extended or adjusted under 35 U.S.C. 154(b) by 0 days.

(21) Appl. No.: 13/590,194

(22) Filed: Aug. 21, 2012

(51) Int. Cl.
*H04W 12/08* (2009.01)

(52) U.S. Cl.
USPC .......................... 455/411; 455/41.1

(58) Field of Classification Search
USPC .............. 455/411, 41.1, 41.2, 412.1, 414.1, 455/404.2, 456.1, 9; 340/568.1, 539.15, 686.6
See application file for complete search history.

(56) References Cited

U.S. PATENT DOCUMENTS

| | | | |
|---|---|---|---|
| 5,646,593 A * | 7/1997 | Hughes et al. ............. 340/573.1 |
| 6,577,239 B2 | 6/2003 | Jespersen et al. |
| 7,378,939 B2 | 5/2008 | Sengupta et al. |
| 7,463,861 B2 | 12/2008 | Eisenbach et al. |
| 7,565,132 B2 | 7/2009 | Ben Ayed |
| 7,664,463 B2 | 2/2010 | Ben Ayed |
| 7,973,657 B2 | 7/2011 | Ben Ayed |
| 8,045,961 B2 | 10/2011 | Ben Ayed |
| 8,107,920 B2 | 1/2012 | Ben Ayed |
| 8,112,037 B2 | 2/2012 | Ketari et al. |
| 8,115,609 B2 | 2/2012 | Ketari et al. |
| 8,165,525 B2 * | 4/2012 | Eisenbach ................... 455/41.2 |
| 8,190,129 B2 | 5/2012 | Ben Ayed |
| 8,195,127 B1 * | 6/2012 | Kwong ........................ 455/411 |
| 8,260,262 B2 | 9/2012 | Ben Ayed |
| 2003/0122671 A1 * | 7/2003 | Jespersen ................... 340/568.1 |
| 2006/0128305 A1 | 6/2006 | Delalat et al. |
| 2009/0221266 A1 * | 9/2009 | Ohta et al. ................... 455/411 |
| 2010/0203874 A1 * | 8/2010 | Scott et al. .................. 455/415 |
| 2011/0169654 A1 * | 7/2011 | Ketari .......................... 340/687 |
| 2012/0100866 A1 * | 4/2012 | Grossman et al. ......... 455/456.1 |
| 2012/0115512 A1 * | 5/2012 | Grainger et al. ........... 455/456.3 |
| 2012/0310531 A1 * | 12/2012 | Agarwal et al. ............. 701/439 |

* cited by examiner

*Primary Examiner* — Cong Tran
(74) *Attorney, Agent, or Firm* — Daniel B. Schein

(57) ABSTRACT

A method and apparatus for securing user data on a mobile device using a Bluetooth fob. The method and apparatus enables robust access security, issues alerts when the user leaves proximity of his/her terminal, and can delete confidential data. The method also teaches using a Bluetooth smart phone soft token for securing data on a mobile device.

20 Claims, 8 Drawing Sheets

SYSTEM FOR SECURING A MOBILE TERMINAL

FIELD OF THE INVENTION

The present invention relates to mobile security and more specifically relates to authentication and encryption using a short wireless BT LE device.

BACKGROUND

User authentication in computing systems traditionally depends on three factors: something you have (e.g., hardware token), something you are (e.g., a fingerprint), and something you know (e.g., a password). In this patent, we explore a new type of short wireless mobile device that performs all these factors and that is compatible with mobile devices.

U.S. Pat. No. 8,045,961 by the current inventor describes a System for Wireless Authentication Based on BLUETOOTH Proximity.

Although this application teaches automatic login, it does not describes real-time recovery and data protection mechanisms such as messaging and data deletion/encryption.

U.S. Pat. No. 7,973,657 by the current inventor titled System For Monitoring Proximity To Prevent Loss Or To Assist Recovery teaches a BLUETOOTH keychain with a proximity alarm, a headset function and that sends data for login.

The current patent does not teach real-time recovery and data protection mechanisms such as messaging and data deletion/encryption.

U.S. Pat. No. 7,664,463 by the current inventor titled Portable Loss Prevention System describes a BLUETOOTH loss prevention system. The described system does not provide real-time recovery and data protection mechanisms such as messaging and data deletion/encryption.

U.S. Pat. No. 8,115,609 by Ketari et al. describes a Proximity Access and Alarm Apparatus that uses a proximity device. Ketari does not describe real-time recovery and data protection mechanisms such as messaging and data deletion/encryption. Similarly, U.S. Pat. No. 8,112,037 by Ketari describes BLUETOOTH access and proximity alarm devices with no real-time recovery and data protection mechanisms such as messaging and data deletion/encryption.

U.S. Pat. No. 7,463,861 by Eisenbach et al. titled Automatic data encryption and access control based on BLUETOOTH device proximity teaches a method and apparatus for securing sensitive data on a secured BLUETOOTH device whereby when contact is lost, sensitive data is automatically encrypted, and when contact is restored, the data is automatically decrypted. Eisenbach's invention does not inform the user when the device is lost. It does not have real-time recovery and data protection mechanisms such as messaging and data deletion.

Thus, a need exists for systems for providing convenient device recovery and data protection in real-time.

SUMMARY OF THE INVENTION

A method for securing a mobile terminal comprising: upon detecting loss of proximity from a previously connected device equipped with a short wireless transceiver, the mobile terminal issues a sound alert after a predetermined period of time, a program onboard the mobile terminal performs actions selected from the group comprised of: dial a phone number and issue a message, send an email message, send a Short Message Service message, wherein said message can comprise current location information, wherein after a predetermined period of time, a program onboard the mobile terminal performs actions selected from the group comprised of: encrypt documents, delete documents, lock application, and lock the mobile terminal.

A method for securing a mobile terminal comprising: pairing the mobile terminal to at least one admin device equipped with a short wireless transceiver, pairing an authentication device equipped with a short wireless transceiver to said at least one admin device, establishing a short wireless connection between said at least one admin device and the mobile terminal and, provisioning the mobile terminal with said authentication device information, wherein said authentication device information is selected from the group consisting of: UUID, BLUETOOTH ID, device ID, NFC ID, provisioning the mobile terminal with user data, wherein said user data is selected from the group consisting of: password, One-time-password, certificate, response to a challenge question, challenge authentication results, biometric reading, biometric authentication results, motion information, acceleration information, interface ID, encryption protocol, obfuscation protocol, provisioning said authentication device with the mobile terminal information, wherein said mobile terminal information is selected from the group consisting of: UUID, BLUETOOTH ID, device ID, NFC ID, wherein after provisioning the mobile terminal and provisioning said authentication device, the mobile terminal can connect to said authentication device.

A system for securing a mobile terminal comprising: a first device equipped with a short wireless transceiver and paired to the mobile terminal, and a second smart phone paired to the mobile terminal using short wireless pairing, wherein upon performing an operation onboard the mobile terminal selected from the group comprised of: launch an application, access an application, push a button, run a function, request information, access a data record, if said first device or said second smart phone is connected to the mobile terminal using a short wireless connection, a program onboard the mobile terminal requests information from the connected device, wherein the requested information is selected from the group comprised of: password, One-time-password, certificate, response to a challenge question, challenge authentication results, biometric reading, biometric authentication results, motion information, acceleration information, wherein upon receipt of a wireless response from a connected device, said program authenticates said wireless response, and upon successful authentication, said operation is authorized, wherein upon detecting loss of proximity from a previously connected short wireless device, the mobile terminal issues a sound alert after a predetermined period of time, a program onboard the mobile terminal performs actions selected from the group comprised of: dial a phone number and issue a message, send an email message, send a Short Message Service message, wherein said message can comprise current location information, wherein after a predetermined period of time, a program onboard the mobile terminal performs actions selected from the group comprised of: encrypt documents, delete documents, lock application, and lock the mobile terminal.

BRIEF DESCRIPTION OF THE FIGURES

The present inventions may be more clearly understood by referring to the following figures and further details of the inventions that follow.

FURTHER DETAILS OF THE INVENTIONS

The most common model for mobile terminal security is server based Mobile Device Management (MDM) solutions. These systems are limited in capability to prevent device loss.

The current invention utilizes features of short wireless transceivers (such as BLUETOOTH, ANT, WIBREE, NFC, ZIGBEE, etc.) to provide proximity monitoring. This new technology also provides several alerts and data protection function when the user mobile terminal is away from the device of the invention, thus preventing loss and theft of mobile terminals, and protecting data in case the device cannot be recovered.

Figure 1:
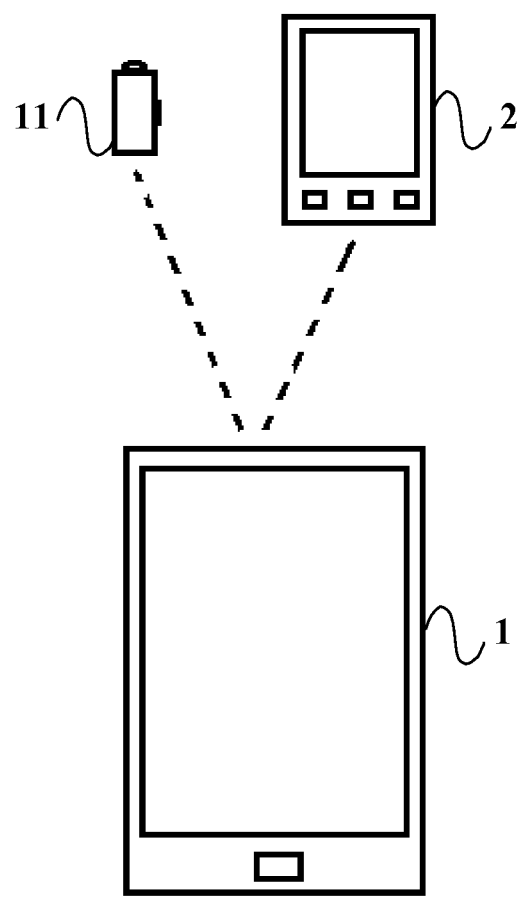
FIG. 1 is a schematic of a system for mobile security.

Referring to FIG. 1, the system for mobile security comprises a mobile terminal 1 that is secured using smart phone 2 and/or short wireless token 11.

Figure 2:
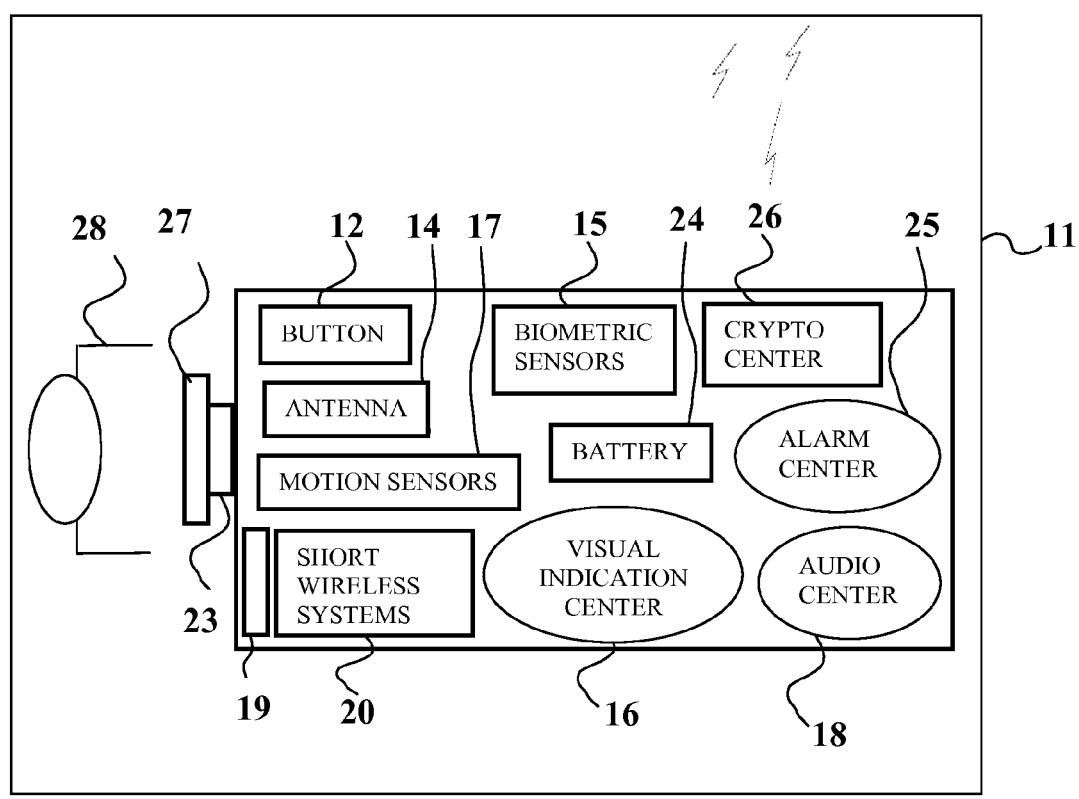
FIG. 2 is a schematic of a short wireless token.

FIG. 2, shows a schematic illustration of a unitary system for short wireless token 11 comprising a short wireless system 20 connected with activation switches 12, antenna 14, biometric sensors 15, visual indication center (or display) 16, motion sensors 17, audio center 18, connectors 19, bearing 23, power store 24, communication center 25, speaker 27 and capsule 28.

Figure 3:
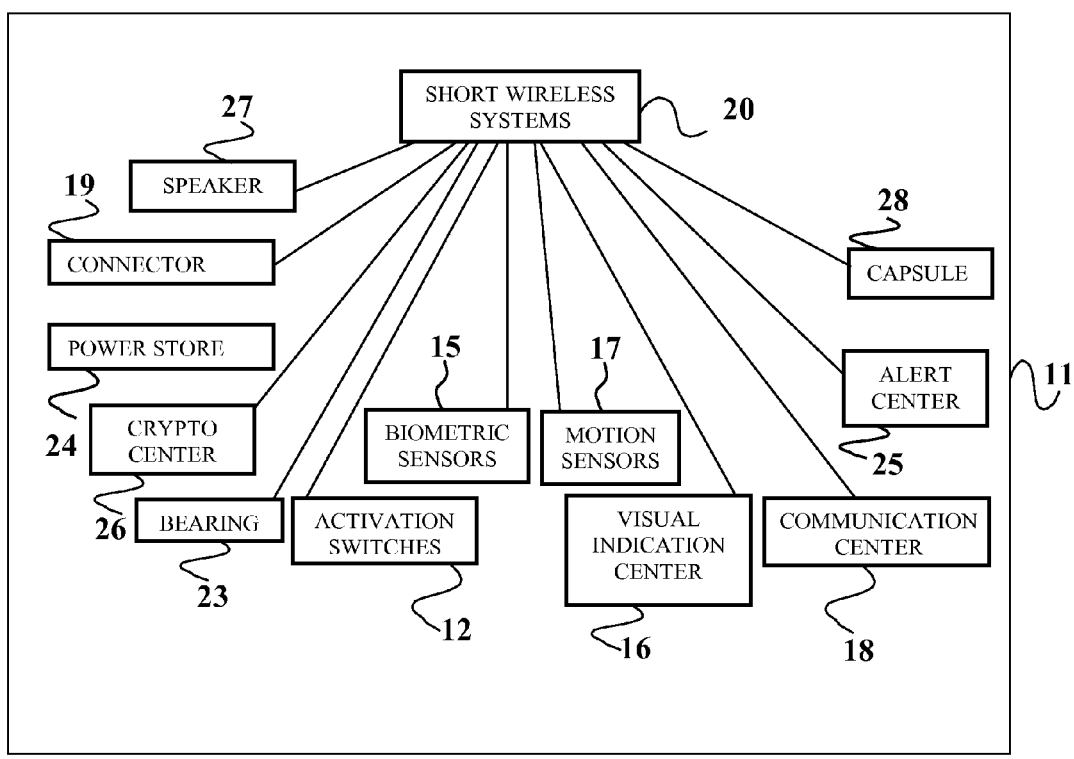
FIG. 3 is a block diagram of a short wireless token.

Referring to FIG. 3, in an embodiment, system for digital signing 11 comprises a short wireless system 20 connected with activation switches 12, antenna 14, biometric sensors 15, visual indication center (or display) 16, motion sensors 17, audio center 18, connectors 19, bearing 23, power store 24, communication center 25, speaker 27 and capsule 28.

Short wireless transceiver 20 enables connectivity over short wireless radio bands and includes a radio and base band IC for BLUETOOTH, Bluetooth Low Energy (LE), WIFI, Near Field Communication (NFC), ANT, ZIGBEE or any combination of the above. In a preferred embodiment, Short wireless token 11 includes ROM, Flash memory, secured memory, Secure Element (a separate chip where only trusted applications have access) or external memory or any other type of memory.

In a preferred embodiment, memory is less than 100 Mega Bytes. In a preferred embodiment, memory is less than 10 Mega Bytes. In another preferred embodiment, memory is less than 1 Mega Byte. Short wireless token 11 may includes a power amplifier (PA) and/or low noise amplifier (LNA) for increasing the transmission range. Short wireless transceiver 20 comprises a Short wireless chipset with on-chip microcontroller (such as the one supplied by CSR), Flash memory and antenna.

Control or activation switches 12 can be any type of button, switch, remote sensor, touch sensor, contact sensor or activation system. Activation switches 12 are used to turn the short wireless token 11 ON/OFF, to shut off the alarm, to change the Short wireless system mode to pairing mode, and/or to start voice transmission for embodiments that have a microphone and/or speaker. For example, a single control button can cycle through a menu of functions by changing the length of time that the button is held and/or the speed with which a first press is followed by a second press (analogous to the single and double click on a computer mouse). One or two control buttons coupled with a simple display screen can adjust a variety of operational parameters.

Switch 12 has several modes. In a preferred mode, a long press of activation button or switch 12 on the base unit 10 indicates ON/OFF event. A long press may be defined by either the length of time that Button or switch 12 is manually held in a second position against a bias that holds the switch in a first position when at rest, or a signal may be given to indicate that a desired mode of operation or desired action has been initiated. For example, a very long press can cause a switch to pairing mode.

Button or switch 12 can be used to dial a number, or to perform actions such as accept/reject a call, or play/stop/forward/back.

Switch 12 can be used to indicate the start of a digital sign operation, to enter a user authorization code (example Morse code), or to indicate the start of voice entry for biometric authentication. Switch 12 can be disabled.

Antenna 14 can be any type of antenna including chip antenna, patch antenna, PCB antenna and dipole antennas.

Biometric sensors 15 can be any type of biometric sensor. In a preferred embodiment, biometric sensor 15 is a microphone for capturing a sample user voice. The sample of user voice can be compared to an existing sample of the original user's voice. The original sample is generally recorded during initiation and configuration phase. If correlation factor is above a threshold, the user is authenticated. In another preferred embodiment, biometric sensor 15 is an accelerometer for capturing accelerations corresponding to user hand signature and authenticating the user signature.

In one embodiment, the short wireless token 11 stores a user biometric identification signature (or an encrypted user biometric identification signature).

The biometric identification signature can be a sample or a pre-processed sample of the user's signature, voice, finger print, iris scan or distinguishing biometric identification. The identification signature can also include variations that correspond to different user conditions, tones, states, moods, etc. Upon receipt of an event or a message to authenticate the user or upon detection of an event—such as wrong PIN code, change of driver, reset, detection of unknown conditions, a predetermined period of time elapses, the short wireless token 11 requests the user to provide biometric information.

Upon reading new user biometric information, the short wireless token 11 sends the new user biometric information to the server for comparison with the stored user biometric identification signature.

Visual indication center 16 comprises LED, LCD, projector or any type of display. The LED can turn on and off periodically to indicate the system is on. The color and frequency of the LEDs can indicate different events such as normal mode, pairing mode, alarm mode, low battery mode, voice mode, etc.

In another embodiment, visual indication center 16 can be an LED, LCD or any other indication means. It can be used to indicate the status of the device, such as whether it is powered, if the Short wireless transceiver system (BT) is discoverable or non-discoverable, if the BT is pairing or paired with another BT, the BT mode, inter alia.

Short wireless token 11 may include an onboard motion sensor 17 or tilt detector. Motion sensor 17 can be used to detect if the user is in motion or idle, and to authorize or deny response depending on if the user is in motion or idle. This is used to reduce a security hack attack "Relay Attack" that is known in keyless entry systems used by car manufacturers. Most keyless entry systems today respond upon receiving a request. This feature is exploited by hackers in order to hack the system. It has been noted that when a user is asking for access to a door, car, Facebook, . . . the user has to stop moving. For that reason, a motion sensor is used to deny responses when the user is not idle and to respond when the user is idle.

Audio center 18 can be any type of microphone, speaker, earphone wire, foldable earpiece, slid able earpiece, pull-up earpiece, telescopic earpiece, rotating telescopic earpiece, etc.

It is understood that audio center 18 is optional and is not necessary for the core operation of short wireless token 11.

Connector 19 can be any type of connector. Connector 19 is used for charging, flashing data, connecting a headset device, connecting a second headset device for stereo sound, or connecting another peripheral.

Bearing 23 can be a pivot, articulation, U joint, a ball joint, pop-up coil, slide rail, a telescoping tube, or any attachment mechanism for a detachable or movable earpiece.

It is understood that bearing 23 is optional and is not necessary for the core operation of short wireless token 11.

Battery 24 provides power to some of the components of system for digital signing 10. Battery 24 can be a fuel cell, nickel-cadmium, lithium, lithium polymer, lithium ion, alkaline or nickel-hydride battery or any other portable source of electric power. Battery 24 can also be replaced with photovoltaic cells, a rechargeable battery, or a battery rechargeable from a distance (such as by induction). When short wireless token 11 is not exchanging data or alarming, it remains in a dormant state ("sleep-mode") to conserve the energy of battery 24. On event selected from: receiving request for data, disconnect event detected, receiving request to establish voice channel, short wireless token 11 leaves the sleep mode and wakes up.

For example, small 1.5 volt batteries, and the like, such as those used in small devices like hearing aids, calculators and watches are widely available and can be used as for a power source. It is noted that on detection of low battery level, short wireless token 11 sends a notification message to the paired device.

Alarm center 25 includes an alarm audible from a distance greater than 6 feet. In a preferred embodiment, the short wireless token 11 does not have an LCD.

In a preferred embodiment, the short wireless token 11 does not have an LCD larger than 3 cm2. A regular alarm is between 65 and 120 decibels at 10 feet. Noise levels above 85 decibels can harm hearing over time. Noise levels above 140 decibels can cause damage to hearing after just one exposure. In a preferred embodiment, alarm center 25 has more than 50 decibels or 50 dBA at 10 feet or exceeds ambient sound level by 5 decibels minimum. In a preferred embodiment, the alarm provides an audible signal of at least 60 decibels to notify the user of a designated event, such as user leaving proximity of mobile phone. The human ear does not respond equally to all frequencies: humans are much more sensitive to sounds in the frequency range about 1 kHz to 4 kHz (1000 to 4000 vibrations per second) than to very low or high frequency sounds. Sound meters are usually fitted with a filter that has a frequency response similar to the human ear. If the "A weighting filter" is used, the sound pressure level is given in units of dB(A) or dBA. In residential areas, most noise comes from transportation, construction, industrial, and human and animal sources. Road traffic noise is the leading source of community noise. The noise can be highly variable. It is common that Day—Night sound levels in different areas vary over a range of 50 dB. The outdoor level in a wilderness area may occur as low as 30 to 40 dBA, and as high as 85-90 dBA in an urban area. Most urban dwellers lives in areas of noise level more than 48 dBA.

Alarm center 25 can be any type of audio, video, tactile or mechanical user interface means capable of conveying information to the user. Audio means can be any audio device such as a speaker, a buzzer, a Piezo buzzer, omni-directional speaker, directional speaker, an ultrasound or any other audio device. Visual means can be an LED, or any visual information display device. Tactile means can be any tactile sensor such as a vibrator, or a heat-generating device.

It is understood that alarm center 25 is optional and is not necessary for the core operation of short wireless token 11.

Crypto center 26 includes authentication, hashing, encryption, AES256, SHA256, Apple Authentication chipset (for communicating with iOS devices) and Secure Element chipsets. It encrypts information and stores it. We can use symmetric encryption such as Advanced Encryption Standard (AES) (AES-128, AES-192 and AES-256), Triple DES (3DES) or asymmetric encryption such as RSA (Rivest, Shamir and Adleman). In this embodiment, the short wireless token 11 and PED use a cryptographic hash function such as SHA-0, SHA-1, SHA-2, MD5 or other hash functions to authenticate each other, prior to the short wireless token 11 sending the one or more keys in encrypted form.

In a preferred embodiment, crypto center 26 comprises an inalterable memory or Secure Element in which the user keys, private keys, certificates, public keys or combination thereof are recorded and that guarantees inviolability of the data. An external certification authority can guarantee that the public key belongs to the operator by means of a certificate.

In an alternative embodiment, the user key can be a private key, a part of a private key, an encrypted private key, an encrypted part of a private key, a public key, a part of a public key, an encrypted public key, an encrypted part of a public key, a certificate.

In an alternative embodiment, the short wireless token 11 uses a user secret code (such as a PIN code) and a stored user key to obtain a user private key.

Speaker 27 can mount to bearing 23 and may allow adjusting the angle and distance of speaker 27 relative to the main body of short wireless token 11 across one or more planes for better comfort.

It is understood that speaker 27 is optional and is not necessary for the core operation of short wireless token 11.

Capsule 28 can easily attach and detach to short wireless token 11. Capsule 28 allows protecting speaker 27 while not in use. Capsule 28 can attach to a key chain and allow easy carrying of short wireless token 11 as a key chain when not in use as a headset, and to easily detach it and use it as a headset when needed.

It is understood that capsule 28 is optional and is not necessary for the core operation of short wireless token 11.

Biometric:

Further, for more security, the user may provide biographic authentication such as be not limited to voice recognition, password entry, retinal scan, finger print, finger vein scanner or other information, thus short wireless token 11 only function if user is validated.

With the use of biometric identification and of challenge response biometrics, the system guarantees non repudiation.

Authentication:

Authenticating a response may involve local authentication, whereby the received data is authenticated.

Authenticating a response may involve communicating with a server, sending data such as user name and password to the server, and waiting for server authentication. Authenticating a response may involve sending data to a RADIUS server (Remote Authentication Dial In User Service) that provides centralized access and authorization. In another embodiment, the application sends a seed and a synchronization time to short wireless token 11. Short wireless token 11 uses a pseudo-random number generator to generate a password, and sends it back to the application. The application sends the password to a server that compares the password to a pseudo-random number generator at the server. If the foregoing matches, the server grants access to the client.

It is noted that once the two-way wireless communication channel is established, the application communicates with short wireless token 11 in real-time. If authentication is successful, the application automatically provides access to the user.

In an alternative embodiment, if connection is not established, response is not received, or response is not authenticated, the application displays a login screen.

In an alternative embodiment, the user may enter configuration parameters for short wireless token 11 through an application. Configuration parameters may include but are not limited to user name, password, private key, authentication parameter, personal info, biometric info, operation hours, operation days, buzzer type, buzzer volume, buzzer duration, alarm type, and user preferences such as seat position, steering wheel inclination, rear view mirror position, side mirror position, radio station, security code and access code. The configuration parameters are flashed onboard the short wireless token 11.

In another preferred embodiment, short wireless token 11 comprises a keypad for entering user data. Alternatively, it may comprise a finger print scanner, a voice synthesizer or an iris scanner for authenticating user. Short wireless token 11 may comprise an LCD.

User Keys

A user digital key can be a private key, public key, part of a private key, part of a public key, an encoded/encrypted/obfuscated private key/public key, part of a private key, part of a public key, a One Time Password (OTP), a response to challenges-response question, a response to OTP challenge-response. The access interface may send an obfuscation/encrypted formula so that short wireless token 11 can obfuscate/encrypt transmitted information, can return it within a predetermined period (for example a second) and so that the lock system may de-obfuscate/de-crypt the returned result. An update program can set short wireless token 11 to discoverable, and can set conditions for pairing or pairing rules. Short wireless token 11 preserves its pairings to old devices for which it was previously paired, and on top of that, it will have pairings to additional new devices.

Provisioning Pairing

Pairing can be provisioned to predefined devices with specific BLUETOOTH IDs.

Pairing can also be provisioned to a number of devices with a specific class of service, or to a number of devices with a specific device name.

Pairing can be provisioned manually:

To pair device A to device B:
1—The user sets device B to discoverable mode: This can be done by pushing a button on device B, by activating a switch, by performing a gesture such as waving or shaking device B, or by sending a wireless message to device B The user can set device B to discoverable for a predefined time period, or for a predetermined number of pairings. Once the pairing conditions are met, short wireless token 11 becomes non discoverable.

2—The user brings device A and device B within proximity, activating a menu on device A, device A discovers and displays devices in pairing mode
3—The user selects device B from the menu
4—The user enters pairing PIN
5—Device B becomes non-discoverable Pairing can also be provisioned automatically through an admin console:
1—The user brings device B within proximity of the admin console
2—The admin console connects wirelessly to device B
3—The admin console provisions device B with the UUID or Bluetooth ID or device ID corresponding to device A
4—The admin console provisions device A with the UUID or Bluetooth ID or device ID corresponding to device A using wireless or wired communication Provisioning Data Short wireless token 11 can be programmed with operation rules such us: turn LED on and off, checking a private key matches a public key, encrypting, obfuscating, returning XML string, storing function codes, responding to messages, encrypting and decrypting voice, scan for other compatible devices, send marketing files, store counters, provide any function.

The update application can also program short wireless token 11 to: store keys, store different keys for different interfaces, store different protocols and authentication methods corresponding to different interfaces.

The update application can program short wireless token 11 to: upon receiving request from an interface, provide one or more keys or data corresponding to the interface. The update application can program short wireless token 11 to store one or more encryption or obfuscation functions identified by one or more function codes, and upon receipt of a message identifying function code x and a number of operands, and/or a random number, execute encryption function x.

Changing challenge questions:

Short wireless token 11 can store a number of functions, each identified by a code. When a message is received with a function code, the corresponding function is found and applied. The function code is sent by PED and can change every transaction. Upon receipt of a reply from short wireless token 11 within predetermined period of time, the application or device or server applies a reverse function corresponding to the sent function code.

In a preferred embodiment, every time PED sends a message, it identifies a different function for encoding/encryption from the previous message.

In another embodiment, every time PED establishes a session with short wireless token 11, it generates a new first code using a first function, and sends the new first code to short wireless token 11. Upon receipt of a new connection request, Short wireless token 11 generates a new expected code using the first function, or a similar function, and checks if the new first code matches the new expected code. If the new first code matches the new expected code, short wireless token 11 responds to the request. If the new first code does not match the new expected code, short wireless token 11 does not respond to the request.

Proximity Alert:

After the user is logged in to an application onboard a mobile device, PC, Web, if a low-signal indication is received from short wireless token 11 or is signal loss is detected, the user application onboard the mobile device or PC may issue warnings to the user, may close any open document, may encrypt any decrypted file, may disconnect, and may issue visual, audible and motion alerts.

If the user is not logged in to an application onboard a mobile device or tablet, short wireless token 11 may connect to the mobile device or tablet as a headset profile or hands free profile. That way, on detection of a loss of link, an alert is issued to the user. After the user is logged in to an application onboard a mobile device or tablet, if the user tries to access the application after being idle for a period of time, then the application checks if a disconnect has occurred during this period of time. If yes, the user is required to enter a PIN code. If the idle period has exceeded a threshold, the user is asked to enter PIN code.

On connection drop, the short wireless token 11 may attempt to reconnect and can issue an intelligent alarm, issue a visual or vibration indication. Furthermore, the application or device may logout the user, may lock, block access, shut down, encrypt data, logout, request biometric authentication, issue alarm, report the event to a remote server, send an alert message, or issue an alarm. Furthermore, the application or device may refuse to perform digital signing operation.

For a mobile phone proximity detector, a connection drop is generally due to the distance between short wireless transceiver 20 and the mobile phone being too large, an obstacle between the two devices, and/or the mobile phone powered down. Automatic reconnection minimizes false alarms and makes the systems of the present invention more reliable and easy to use. An exemplary benefit of the automatic reconnect feature is that when a user comes into proximity of the mobile phone from out of range, the alarm automatically shuts off without requiring any additional input from the user.

In a preferred embodiment of the present inventions, short wireless token 11 will generate an indication or message on detection of a connection drop. The firmware detects a disconnect indication and instructs one or more responses to a disconnect indication. For example, the program will instruct a reconnection attempt and/or instruct issuance of an alert.

It has been discovered by the present inventor that the disconnect event indicator is reliable for detecting that a monitored device is outside a desired range. The claimed invention has an automatic reconnect attempt feature, so that upon detection of a disconnect event, reconnection is attempted; this can avoid many false alarms. Preferably, in an embodiment, an alarm instruction is not given until at least one active reconnect attempt is made and fails. Upon the alarm issuing, periodic reconnect efforts are made, and upon reconnection the alarm will not continue. Avoidance of false alarms makes the invention more convenient for the user.

Furthermore, on detection of signal strength (RSSI) below a threshold, the short wireless system can send a message to the host terminal indicating low signal strength or return to normal mode. This information can be used to allow/deny access, close applications, lock screen, encrypt files, issue warnings, etc.

Data Synchronization

The short wireless token 11 can be connect to a computer using port 19 and user data can be flashed to system 11 or written to memory (RAM or flash) onboard system 11. User data can be password, private keys, public keys, authentication parameter, personal info, biometric info, OTP seed, configuration parameters, operation hours, operation days, buzzer type, buzzer volume, buzzer duration, and alarm type. Those parameters can be flashed on short wireless token 11 by connecting it to another programming device (e.g. programmer, vehicle computer). Those parameters can also be transferred wirelessly and stored.

A user can purchase/acquire/install a lock system that comes with a digital access code (provided on a CD, memory card, USB flash, email, or any way for transferring digital data). The user can later update short wireless token 11 with the new digital access code by connecting short wireless token 11 to a PED, and transferring the new digital access code to short wireless token 11. The new digital code will be stored onboard short wireless token 11. The new digital code may be transferred to short wireless token 11 through SPI flashing or DFU (Device Firmware Upgrade) or any other method of writing data to device.

In another embodiment, the user may use the short wireless token 11 with a first device in a first space, and then connect to a second device in a second space. The first device in a first space may provide short wireless token 11 with information such as last used radio station, last played record, last seat position, last rear-view mirror position, last light settings, last user adjustments, last visited web sites, last viewed channel, last environment variables, last user settings and preferences. The information is written to the memory wirelessly without connecting a cable. The information may be written to flash memory. When the user connects to the second device, the second device may request the last environment variables or the last user settings and preferences. It may use them to set the settings and preferences on the second device to the same values as those on the first device.

For example, a user is inside the home, and is listening to radio station A. When the user goes to his/her car, the car radio will set to radio station A.

No Reset:

Short wireless token 11 is designed so that it does not allow reset, and it does not go to discoverable mode unless it is updated through an authorized update application The short wireless token 11 pairs with a second apparatus. Once paired to a predefined number of devices, it becomes undiscoverable or invisible to any other device except second apparatus and will not respond to any request from any device except second apparatus. It can establish secure two-way wireless connection with a second apparatus.

In another preferred embodiment, if number of unsuccessful pairing attempts exceeds a predefined number, the short wireless token 11 changes to undiscoverable.

In another preferred embodiment, if period of time passed exceeds a predefined period, the short wireless token 11 changes to undiscoverable.

In a preferred embodiment, the short wireless token 11 does not have a reset button, cannot be reset and cannot change to discoverable mode unless through a specific programmer system or using a firmware that has appropriate signatures to be loaded onto the short wireless token 11 and to instruct it to reset or to change to pairing mode or to change to discoverable.

In a preferred embodiment, the short wireless token 11 appears as a BLUETOOTH headset to other Short wireless mobile devices. After the user initiates a pairing request, the short wireless token 11 obtains the Short wireless address of the device to be monitored and stores it in memory. Short wireless transceiver 20 changes to undiscoverable mode and visual information center 16 changes to normal mode.

Earpiece:

Short wireless token 11 may have a foldable or slide able earpiece 27. The earpiece 27 can be used as a BLUETOOTH headset. Also, voice from earpiece 27 can be encrypted and voice from microphone encrypted onboard Short wireless token 11.

In another embodiment, earpiece 27 connects to Short wireless token 11 through connector 19.

API:

In another preferred embodiment, short wireless token 11 comes with an API (application programming interface) that allows developers to integrate wireless authentication in their applications based on BLUETOOTH or short wireless proximity. Wireless authentication enables automatic login function or single log-on function based on short wireless proximity. The login may involve verifying the user credentials against a local database or sending them to a Remote Authentication Dial In User Service (RADIUS) server. The developer application can be any PC, server or mobile terminal application including web applications that run in a browser. When short wireless token 11 is within proximity, the user is logged in automatically. When short wireless token 11 is out of proximity, the user is not logged in automatically. This provides a secure platform for enterprise applications where access is granted to people that carry short wireless token 11, however, unauthorized users that do not carry short wireless token 11 are not granted access. This feature also prevents identity theft and unauthorized access. Furthermore, since mobile phones and mobile terminal can be lost stolen and forgotten, this system prevents loss and theft, and at the same time prevents access by unauthorized users.

In another preferred embodiment, the web application API makes a call to a browser plug-in. The plug-in enables the browser to automatically install short wireless drivers if they are not previously installed (user authorization may be required). Furthermore, the plug-in enables the browser application to communicate with short wireless token 11 and to send and receive data to/from it. For example, the application may request user name and/or password from short wireless token 11. The application may also request digital keys or any other information.

In another preferred embodiment, short wireless token 11 comprises authentication means such as finger print reader, voice synthesizer, iris scanner.

Charging

In another embodiment, short wireless token 11 can charge its battery from a vehicle's ignition system, whereby when short wireless token 11 is placed in the ignition system, it recharges. In a preferred embodiment, short wireless token 11 has an induction charger.

All in One

A Since most people carry a wallet, a mobile phone and keys, short wireless token 11 provides a user with valuable all in one features and at the same time does not require the user to carry an extra device. The features include:

—Proximity alarm for mobile phone —Headset for mobile phone —Locator for parked vehicle —Vehicle keys —Door keys —NFC Small Size:

A significant benefit of this system is the ability to monitor a connection while keeping power consumption to a very low level. This enables one of ordinary skill in the art to build portable devices in accordance with the present inventions that use small batteries (100-200 mAh), which can last for at least 2 or 3 weeks before being recharged or swapped.

Short wireless token 11 may have a sleep mode and when in sleep mode, battery consumption is below 1 mA. Short wireless token 11 consumption is generally below 40 mA. Its size is below 15 cubic centimeters, and it weighs less than 25 grams. In a preferred embodiment, short wireless token 11 has a size equal to or smaller than 5 cm×3 cm×1.5 cm or 22.5 cubic centimeters ("cc") and is less than 50 g in weight. In an embodiment, there are no manually operated controls (e.g., off-on or activation button is magnetically operated, so the housing is not provided with button or switch access), and the device may not have a display.

Short wireless token 11 may have a detachable capsule 28 that has a keychain ring. An attachment mechanism or system, including but not limited to a hook, harness, notebook security lock, insert, pin, clip, badge, clip, key chain, ring, tee, dog collar, Velcro, ring, fastening mechanism, sticky surface are optionally attached to the short wireless token 11.

In an embodiment, short wireless token 11 can be inserted beneath the skin of a human or animal or included inside the housing of objects such as portable computers. Short wireless token 11 can also be encased in waterproof packaging and attached to clothes. Short wireless token 11 may have a lighted area where a logo can be placed. For example, the status LED can be used to periodically light a logo thus increasing the value of the system.

Figure 4:
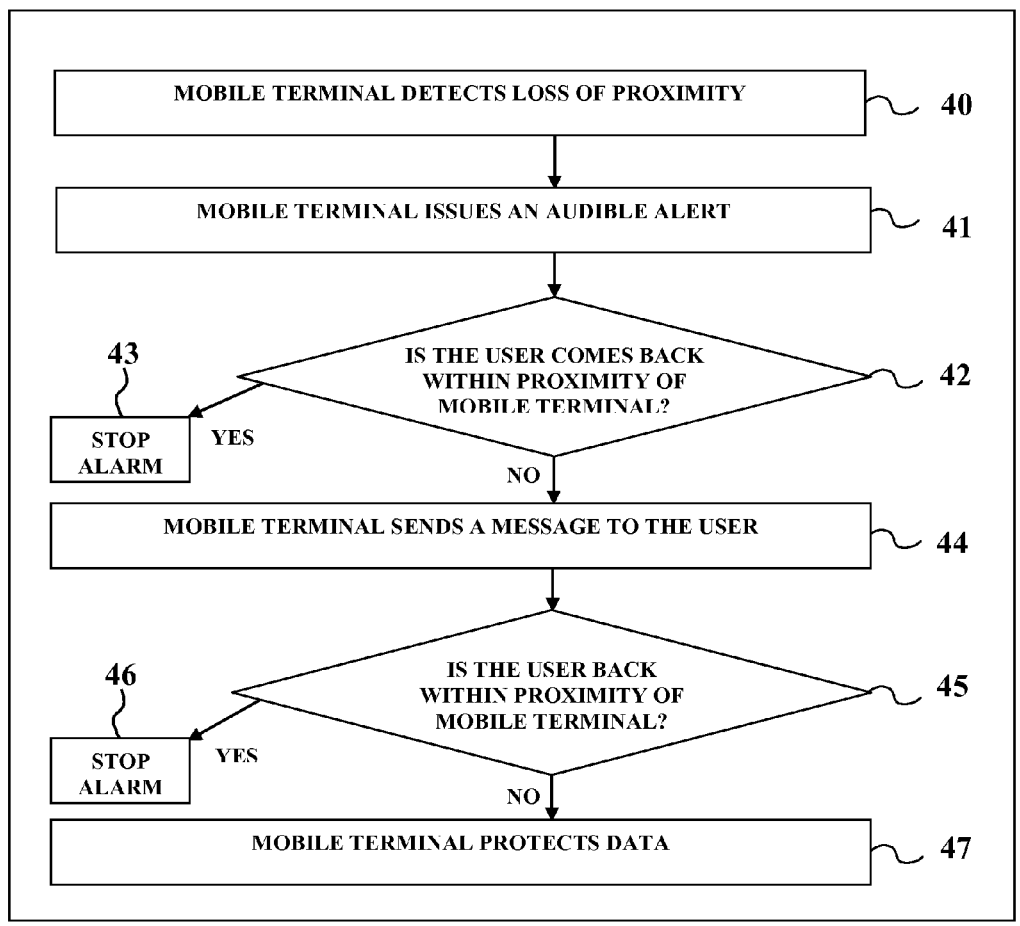
FIG. 4 is a flowchart illustrating an operation of a system for securing a mobile terminal.

Referring to FIG. 4, the flowchart illustrates the steps involved in securing a mobile terminal using a short wireless device. The mobile terminal can be a tablet, a laptop, a PDA, a wireless email device, an instant messaging device, a pager, an MP3 player, a portable radio, or any device.

In step 40, a mobile terminal detects loss of proximity to at least one second short wireless device. Loss of proximity happen on the following conditions: Radio Frequency (RF) signal between the mobile terminal and the short wireless device is lost, RF signal level is below a predetermined threshold, RF signal RSSI is below a predetermined threshold, RF signal quality is below a predetermined threshold, distance between the mobile terminal and the short wireless device is above 15 feet, 30 feet, 50 feet, 100 feet or 200 feet. It is noted that the proximity distance of 30-50 feet corresponds to the default range of Bluetooth Class 2 devices.

In step 41, the mobile terminal issues an audible alert, generally above 60 dB or 80 dB.

In step 42, if the user comes back within proximity of the mobile terminal, the alarm stops in step 43.

In step 42, if the user does not come back within proximity within a pre-determined period of time of 1, 2, 5, 10, 20 or 30 minutes, the mobile terminal sends a message to the user in step 44. For example, it can call the user on his/her mobile phone, and issue an alert message. It can also indicate its location through a synthesizer. In another embodiment, the mobile terminal instructs a VOIP server to call a number and relay a message or location.

In another embodiment, the mobile terminal sends a text message such as SMS or email to a pre-determined address such as the user address, or IT address.

In step 45, if the user comes back within proximity of the mobile terminal, the alarm stops in step 46.

In step 45, if the user does not come back within proximity within a pre-determined period of time of 1, 2, 5, 10, 20 or 30 minutes, the mobile terminal will protect the data in step 47. For example, it can clear memory, delete the user data, encrypt data, delete applications, and lock the mobile terminal.

Figure 5:
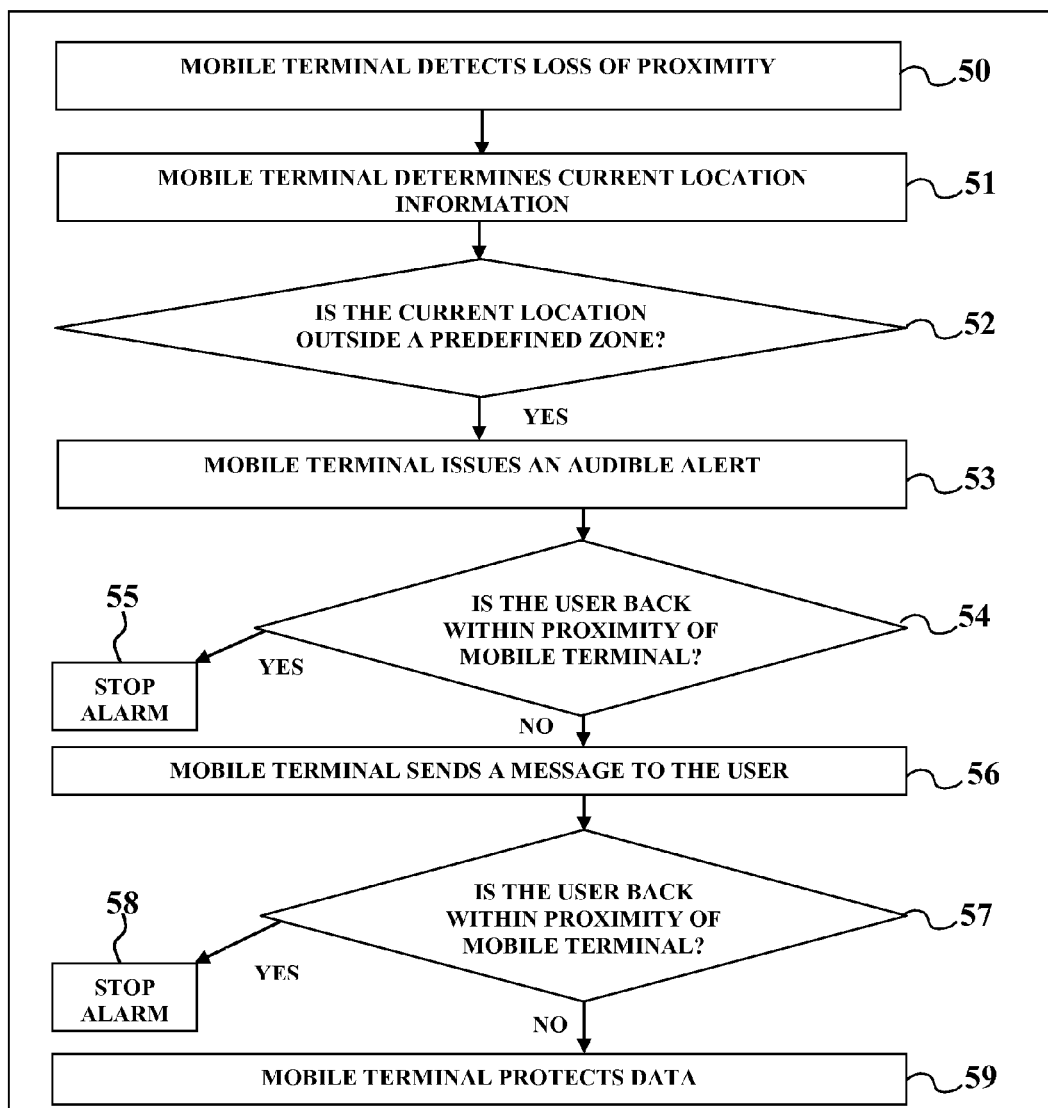
FIG. 5 is a flowchart illustrating an alternative operation of a system for securing a mobile terminal.

Referring to FIG. 5, the flowchart illustrates an alternative way for securing a mobile terminal using a short wireless device.

In step 50, a mobile terminal detects loss of proximity to at least one second short wireless device.

In step 51, the mobile terminal determined the current location using any location technology available such as GPS, triangulation, Wifi . . . and if the current location is outside a predefined zone, the mobile terminal goes to alarm mode. Also, if the current location is inside a predefine zone, the mobile terminal does not alarm.

The predefned zone is generally configured on the device, and corresponds to trusted locations such as office locations, employee home, or any other predefined zone.

Upon the mobile terminal leaving a predefined zone, a program onboard the mobile terminal sends an indication to a short wireless device, wherein upon the mobile terminal entering a predefined zone, a program onboard the mobile terminal sends an indication to a short wireless device.

The method of claim 1 wherein upon the mobile terminal leaving a predefined zone, said previously connected device monitors proximity to the mobile terminal, wherein upon loss of proximity, said previously connected device issues an alarm.

When in alarm mode, in step 53, the mobile terminal issues an audible alert, generally above 60 dB or 80 dB.

In step 54, if the user comes back within proximity of the mobile terminal, the alarm stops in step 55.

In step 54, if the user does not come back within proximity within a pre-determined period of time of 1, 2, 5, 10, 20 or 30 minutes, the mobile terminal sends a message to the user in step 56. For example, it can call the user on his/her mobile phone, and issue an alert message. It can also indicate its location through a synthesizer. In another embodiment, the mobile terminal instructs a VOIP server to call a number and relay a message or location.

In another embodiment, the mobile terminal sends a text message such as SMS or email to a pre-determined address such as the user address, or IT address.

In step 57, if the user comes back within proximity of the mobile terminal, the alarm stops in step 58. In step 59, if the user does not come back within proximity within a pre-determined period of time of 1, 2, 5, 10, 20 or 30 minutes, the mobile terminal will protect the data in step 59. For example, it can delete the user data, encrypt data, delete applications, and lock the mobile terminal.

Figure 6:
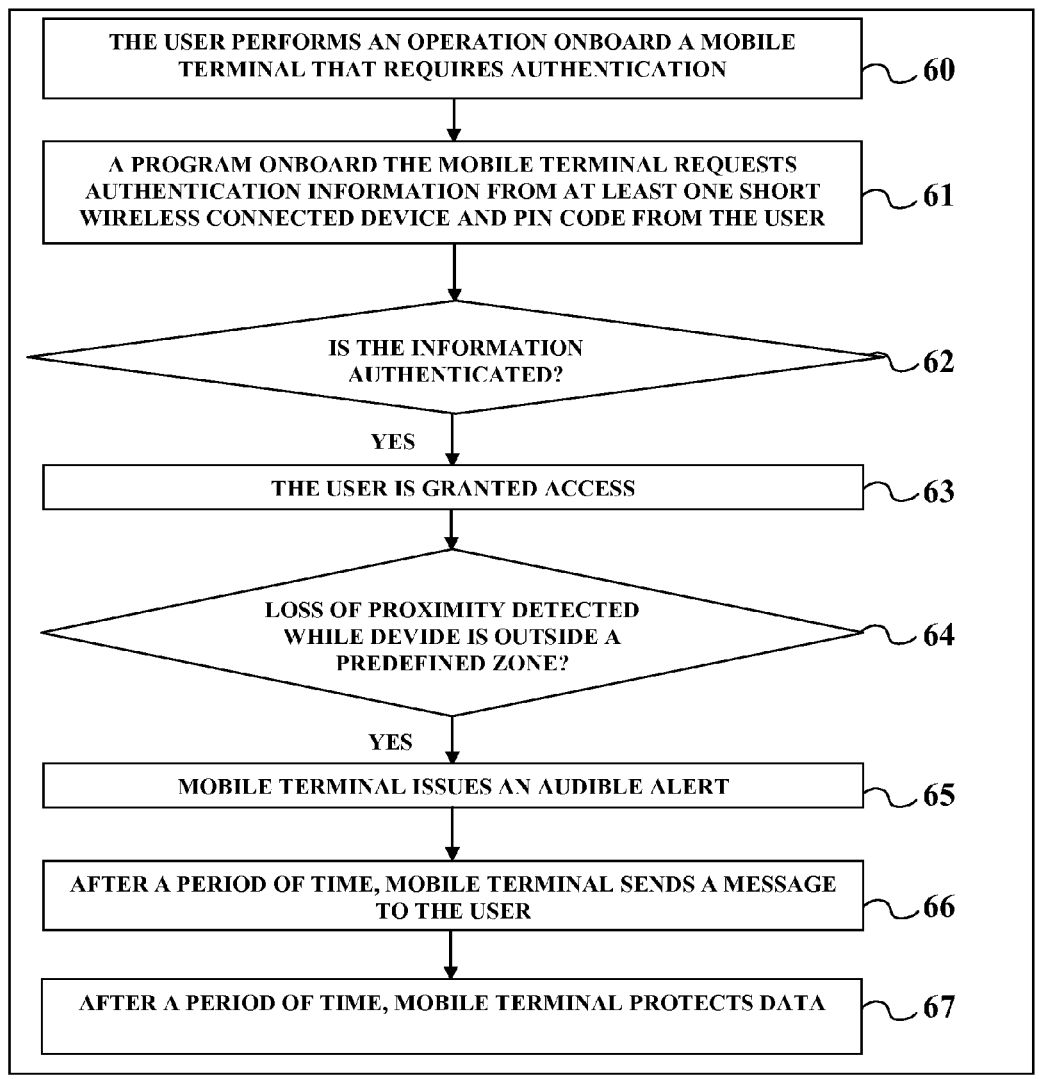
FIG. 6 is a flowchart illustrating an alternative operation of a system for securing a mobile terminal.

Referring to FIG. 6, the flowchart illustrates an alternative way for securing a mobile terminal using a short wireless device.

In step 60, the user performs an operation onboard the mobile terminal that requires authentication. For example, launch an application, access an application, push a button, run a function, request information, access a data record.

A program onboard the mobile terminal requests authentication information from at leasr one short wireless connected device, and may request a PIN code from the user in step 61. The user can log to the mobile terminal using strong authentication wherein short wireless token 11 provides the token for strong authentication. The user may enter a PIN code or a password. Alternatively, the user may login without strong authentication. A short wireless transceiver 20 onboard short wireless token 11 establishes a Bluetooth short wireless SPP (Serial Port Profile), HID (Human Interface Device) or iAP (iPhone SPP-like protocol). Other connection profiles may be possible.

In a preferred embodiment, the mobile terminal—for example a tablet—is paired to a hardware token as well as to a mobile phone running a software token. When the user starts an application onboard the mobile terminal, it will check if a hardware token is connected with short wireless communication, and if so, it will request authentication parameters from it. If not, it will check is a mobile phone running a software token is connected with short wireless communication, and if so, it will request authentication parameters from the software token application.

This feature enables the user to use a hardware token, and to have a backup software token when he/she is travelling or the hardware token is not working (low battery, device lost . . . )

If no hardware token is connected to the mobile terminal using a short wireless connection, and no mobile phone with a software token is connected to the mobile terminal using a short wireless connection, the user operation is not authorized.

In another embodiment, the mobile terminal is paired to one mobile phone device running a software token.

In another embodiment, the mobile terminal is paired to multiple mobile phone devices running multiple software tokens.

In step 62, if the information from the wireless connected device is authenticated and the user PIN is authenticated in step 62, the user is granted access in step 63.

In step 64, if loss of proximity is detected while the device is outside a predefined zone, the mobile terminal issues an audible alert in step 65.

In step 66, after a period of time of 1, 2, 5, 10, 20 or 30 minutes, if the user is not back in proximity, the mobile terminal sends a message to the user. A message can be a phone call to the owner of the mobile terminal (on his cell phone), a phone call with a synthesized voice played, a phone call with a text-to-speech voice synthesizer that plays the location information, an SMS or email to the owner of the mobile terminal or to the IT department, an email, an SMS or email with location information.

In step 67, after a period of time of 1, 2, 5, 10, 20 or 30 minutes, if the user is not back in proximity, the mobile terminal protects the data on the mobile terminal.

The mobile terminal can encrypt documents, delete documents, lock applications, delete applications, and lock the mobile terminal.

Figure 7:
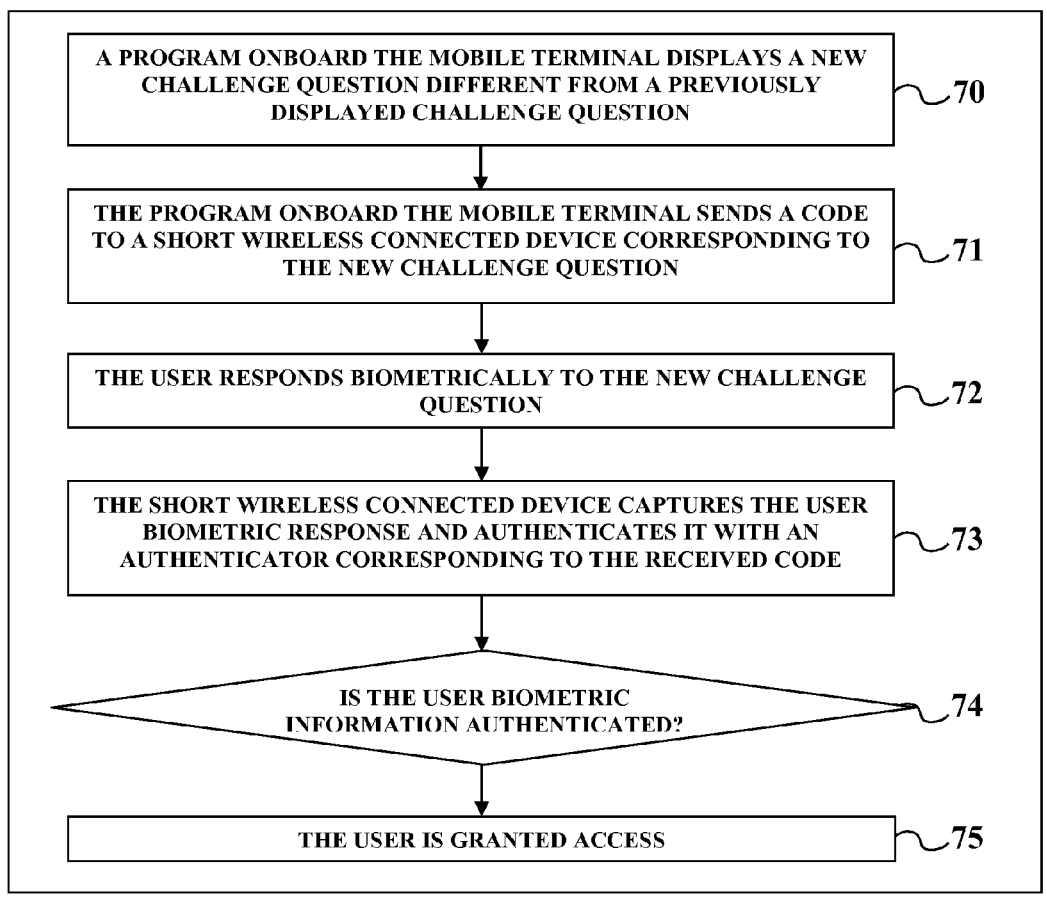
FIG. 7 is a flowchart illustrating dynamic biometric challenge response.

Referring to FIG. 7, the flowchart illustrates dynamic biometric challenge response. In step 70, a program onboard the mobile terminal requiring biometric authentication displays a challenge question. The challenge question changes every time a new access is requested, and is different from a previously displayed challenge question. The challenge question can be read using a speaker.

In step 71, the program onboard the mobile terminal sends a code corresponding to the challenge question to a short wireless connected device such as a mobile phone or a token.

In step 72, the user responds biometrically to the new challenge question, and the short wireless connected device captures the user biometric response and authenticates it in step 73. The short wireless connected device uses an authenticator corresponding to the received code.

In a preferred embodiment, the user responds orally, and the short wireless connected device captures the user voice response, and authenticates it against a set of pre-recorded user responses corresponding to the challenge question and the code associated with the challenge question.

In step 74, if the user biometric information is authenticated, the user is granted access in step 75.

Figure 8:
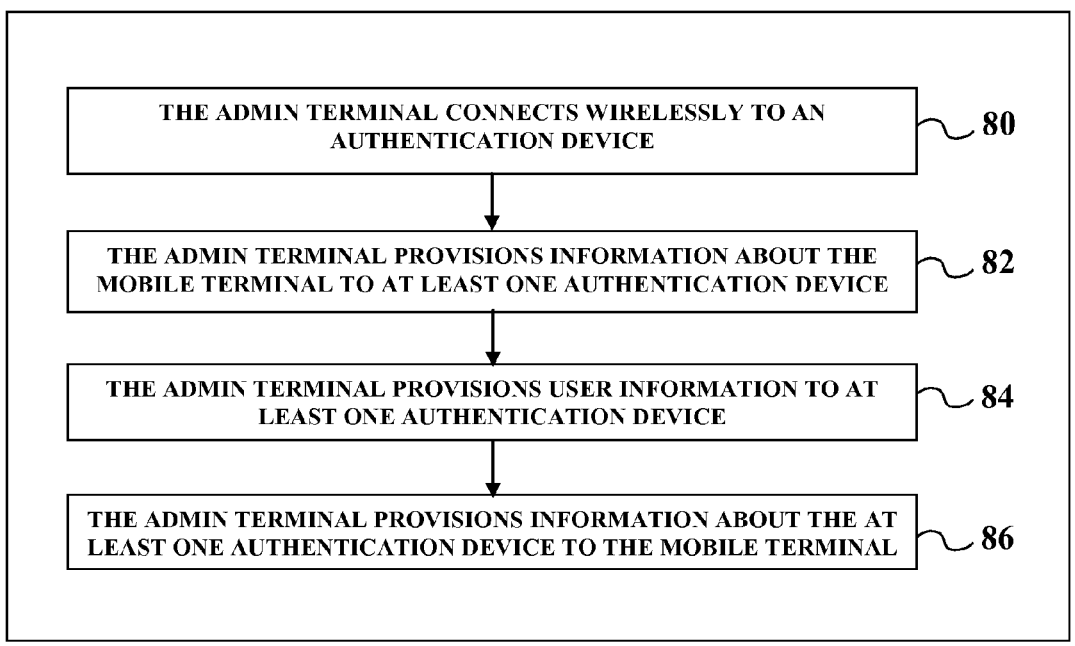
FIG. 8 is a flowchart illustrating provisioning UUID. Similar reference numerals are used in different figures to denote similar components.

Referring to FIG. 8, the flowchart illustrates provisioning UUID or BLUETOOTH ID, thus providing automatic pairing.

In step 80, the administration terminal connects wirelessly to at least one authentication device, and, in step 82, authenticates the authentication device (with challenge response, or PKI or any type of authentication to ensure the integrity of the authentication device), and to ensure there is no man-in-the-middle or relay attacker . . . . The admin terminal establishes secure communication and provisions information about the mobile terminal to the authentication devices (UUID or BLUETOOTH ID or device ID).

In step 84, the admin terminal provisions user information to the authentication devices. In step 86, the admin terminal provisions information about the authentication devices to the mobile terminal (through WIFI, GPRS, 3G, 4G wireless communication . . . ). These are UUID or BLUETOOTH ID or device ID of the authentication devices as well as authentication PIN code, certificates, etc.

BLUETOOTH

The BLUETOOTH specification (a de facto standard containing information required to ensure that devices supporting the protocol can communicate with each other worldwide) defines two transmission ranges for personal area networking. The range is between 10 m and 100 m without a line of sight requirement. The radio link is capable of voice and data transmission up to a maximum capacity of 720 kbps per channel. Any other range can be designed.

A short wireless network is completely self organizing, and ad hoc personal area networks (PANs) can be established wherever two or more devices supporting the protocol are sufficiently close to establish radio contact. Equipment capable of short wireless connectivity is able to self-organize by automatically searching within range for other devices. Upon establishing a contact, information is exchanged which determines if the connection should be completed or not. During this first encounter, the devices connect via a process of authorization and authentication.

Short wireless Pairing happens when two devices agree to communicate with one another. When this happens, the two devices join what is can be referred to as a trusted pair. When one device recognizes another device in an established trusted pair, each device automatically accepts communication, bypassing the discovery and authentication process that normally happen during short wireless interactions. When short wireless pairing is being set up, the following usually happens:

1. Device A (such as a handheld) searches for other short wireless enabled devices in the area.

How does A find these devices? The devices that are found all have a setting that makes them discoverable when other short wireless devices search. It's like raising your hand in a classroom: the discoverable devices are announcing their willingness to communicate with other short wireless devices. By contrast, many short wireless devices can toggle their discoverability settings off. When discoverability is off, the device will not appear when other devices search for it. Undiscoverable devices can still communicate with other short wireless devices, but they must initiate all the communications themselves.

2. Device A detects Device B (e.g. a second handheld that's discoverable).

During the discovery process, the discoverable devices usually broadcast what they are (such as a printer, a PC, a mobile phone, a handheld, etc.), and their short wireless Device Name (such as "Bob's Laptop" or "deskjet995c"). Depending on the device, you may be able to change the Device Name to something more specific. If there are 10 short wireless laptops and 5 short wireless mobile phones in range, and they are all discoverable, this can come in handy when selecting a specific device.

3. A asks B to send a Passkey or PIN

A passkey (or PIN) is a simple code shared by both devices to prove that both users agree to be part of the trusted pair. With devices that have a user interface, such as handhelds, mobile phones, and PCs, a participant must enter the passkey on the device. With other types of devices, such as printers and hands-free headsets, there is no interface for changing the passkey on the device, so the passkey is always the same (hard coded). A passkey used on most short wireless/BLUETOOTH headsets is "0000". The passkeys from both parties must match.

4. A sends the passkey to B

Once you've entered the passkey on A, it sends that passkey to B for comparison. If B is an advanced device that needs the user to enter the same passkey, it will ask for the passkey. If not, it will simply use its standard, unchanging passkey.

5. B sends passkey back to A

If all goes well, and B's passkey is the same entered by A, a trusted pair is formed. This happens automatically when the passkeys agree. Once a trusted pair is developed, communication between the two devices should be relatively seamless, and shouldn't require the standard authentication process that occurs between two devices who are strangers. Embodiments of the present inventions take advantage of the reduced power requirements of certain short wireless/BLUETOOTH modes following pairing of two devices.

BLUETOOTH has several types:

i) Class 2: a class 2 BLUETOOTH transceiver can discover pair and communicate with any BLUETOOTH transceiver within a radius of 10 meters seamlessly.

ii) Class 1: A class 1 BLUETOOTH transceiver can discover pair and communicate with any BLUETOOTH transceiver within a radius of 100 meters.

iii) Class 3: A class 3 BLUETOOTH transceiver can discover pair and communicate with any BLUETOOTH transceiver within a radius of 2 meters.

iv) Non standard devices: can be designed to discover pair and communicate with any BLUETOOTH transceiver within any distance less than 300 meters.

In any wireless networking setup, security is a concern. Devices can easily grab radio waves out of the air, so people who send sensitive information over a wireless connection need to take precautions to make sure those signals aren't intercepted. BLUETOOTH technology is no different—it's wireless and therefore susceptible to spying and remote access, just like WIFI is susceptible if the network isn't secure. With BLUETOOTH, though, the automatic nature of the connection, which is a huge benefit in terms of time and effort, is also a benefit to people looking to send you data without your permission.

BLUETOOTH offers several security modes, and device manufacturers determine which mode to include in a BLUETOOTH-enabled gadget. In almost all cases, BLUETOOTH users can establish "trusted devices" that can exchange data without asking permission. When any other device tries to establish a connection to the user's gadget, the user has to decide to allow it. Service-level security and device-level security work together to protect BLUETOOTH devices from unauthorized data transmission. Security methods include authorization and identification procedures that limit the use of BLUETOOTH services to the registered user and require that users make a conscious decision to open a file or accept a data transfer. As long as these measures are enabled on the user's phone or other device, unauthorized access is unlikely. A user can also simply switch his BLUETOOTH mode to "non-discoverable" and avoid connecting with other BLUETOOTH devices entirely. If a user makes use of the BLUETOOTH network primarily for synching devices at home, this might be a good way to avoid any chance of a security breach while in public.

In the current application, once short wireless token 11 is paired, it becomes "non-discoverable". Also, to further avoid any chance of a security breach, short wireless token 11 does not have a reset button or reset function.

If reset is needed, an administrator may flash a new program file to short wireless token 11 thus re-enabling the pairing capability. This feature is important as it prevents anybody from hacking the device or learning how it functions, or what protocols it uses. BLUETOOTH Wireless Technology Profiles: In order to use BLUETOOTH wireless technology, a device must be able to interpret certain BLUETOOTH profiles. The profiles define the possible applications. BLUETOOTH profiles are general behaviors through which BLUETOOTH enabled devices communicate with other devices. BLUETOOTH technology defines a wide range of profiles: Hands-Free Profile (HFP). Headset Profile (HSP), Serial Port Profile (SPP), DUN, FAX, HSP and LAN profiles, Human Interface Device Profile (HID), Advanced Audio Distribution Profile (A2DP), Audio/Video Control Transport Protocol (AVCTP), Audio/Video Distribution Transport Protocol (AVDTP), Audio/Video Remote Control Profile (AVRCP). Apple uses a proprietary protocol similar to SPP called iAP. These protocols can be run one at a time, or in parallel.

In sniff mode, a device listens only periodically during specific sniff slots, but retains synchronization with the paired BLUETOOTH device onboard the monitored device. In other embodiments, short wireless transceiver 20 can use BLUETOOTH hold mode wherein a device listens only to determine if it should become active, or park mode wherein a device transmits its address. Sniff mode assures very low power consumption and thus extends battery life.

In sniff mode, a BLUETOOTH master radio frequency unit (e.g., base) addresses a slave radio frequency unit (e.g., remote), which enables the slave to synchronize to the master by sending poll packets and optionally null packets over an active link, the master being arranged so that receipt of a response from the slave unit to a poll packet is sufficient to maintain the active link. The slave unit does not have to respond to all poll packets. This approach can allow the slave to preserve more (transmit) power by going into a deep sleep mode in which a low power oscillator may be used while still allowing the master unit to detect whether the slave has resynchronized or not (and thus to update a Link Supervision Timer, for example).

The invention as claimed has utility in that it allows to recovers lost mobile terminals in real-time. If a mobile terminal is left behind in an un-trusted location, then as soon as the user goes out of proximity, it will alarm. If the user does not come back within proximity, then the mobile terminal will message the user and IT people by dialing, SMS'ing a remote device, emailing and indicating the location of the lost mobile terminal.

In a preferred embodiment, actions include dial a phone number and issue a message, call a remote device and issue a message, call a remote device and issue an audible message, call a remote device that is more than 100 meters away and issue an audible message, send an email message, send a Short Message Service message, send a message to a remote server, instruct a remote server to call a remote device an issue a message, instruct a remote VOIP server to call a remote device and issue a message.

If the user does not come back within proximity, it delete or encrypt data on the mobile terminal and clear memory.

In a preferred embodiment, operation is authorized only if both a hardware token device and at least one mobile phone are connected to the mobile terminal using short wireless communication and both of them respond to requests.

The invention as claimed has further utility in that it can use hardware tokens as well as software tokens running on a second mobile device. The hardware token is generally attached to the user key chain, watch or badge. The soft token is useful when the user is travelling and does not want to take a key chain, if the user looses the hardware token, or if the hardware token is not working . . . . In this case, the user mobile phone running the software token can be used as an authentication device for the mobile terminal. It is noted that the software token cannot have all the capabilities of a hardware token. For example, a software token running on the mobile phone does not provide two factor authentication when the user is accessing the network from the mobile phone.

The invention as claimed has further utility in that configuration of a mobile terminal and an associated hardware or software token can be provisioned through an admin console, and pairing between the mobile terminals and the associated hardware or software token can be configured by an administrator. Generally, the administrator configures the hardware tokens by connecting to them directly either through short wireless communication or through DFU (device firmware upgrade). As for the mobile terminal or soft token, the admin generally connects to them through 3G/4G/LTE or equivalent. The admin can also configure the mobile terminal manually through the user interface. Moreover, the admin can also configure the mobile terminal through short wireless communication such as BLUETOOTH or Wifi.

The combination of features disclosed in this application allows having a strong authentication as well as data and physical device protection. These features also allow provisioning a device and its authenticator automatically.

The combination of features disclosed in this application allows having digital signing features. The mobile terminal can send a message digest wirelessly to the authentication device and request signing. The authentication device encrypts the 0 message digest using a private key, and sends the signed message digest to the mobile terminal wirelessly.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:
1. A method for securing a mobile terminal comprising:
after detecting loss of Bluetooth proximity from a previously connected authentication device determine the current location of the mobile terminal,
whereby if the current location is in a predefined zone, lock access to at least one application, whereby if the current location is outside a predefined zone, go to an alert mode, wherein when in alert mode the mobile terminal locks access to at least one application,
  wherein after a predetermined period of time, a call is made to a first remote device,
  wherein after a predetermined period of time, a call is made to a second remote device,
  wherein after a predetermined period of time,
    an email message comprising information about the current location of the mobile terminal is sent,
    a Short Message Service message comprising information about the current location of the mobile terminal is sent,
      wherein said current location is determined using a means selected from the group consisting of onboard GPS and Wifi,
    wherein after a predetermined period of time, data can be deleted,
  whereby when the previously connected authentication device is detected using Bluetooth protocol, the mobile terminal aborts the alert mode.

2. The system of claim 1 wherein:
  said authentication device comprises a short wireless transceiver selected from the group consisting of:
    BLUETOOTH Low Energy, BLUETOOTH, ANT, NFC, Wibree and Wifi.

3. The method of claim 1 whereby said loss of Bluetooth proximity is selected from the group consisting of:
  radio frequency signal loss, radio frequency signal level is below a predetermined threshold, radio frequency signal RSSI is below a predetermined threshold, radio frequency signal quality is below a predetermined threshold, distance between said first personal electronic device and said mobile terminal is above a threshold selected from the group consisting of 15 feet, 30 feet, 50 feet, 100 feet and 200 feet.

4. The method of claim 1 comprising:
  said authentication device issues an audible alert.

5. The method of claim 1 comprising:
  after detecting loss of proximity from an authentication device,
    determine the current location of the mobile terminal,
    if the current location is in a predefined zone,
      the mobile terminal does not go to said alert mode.

6. The method of claim 1 wherein after performing an operation onboard the mobile terminal selected from the group consisting of:
  launch an application, access an application, push a button, run a function, request information, access a data record,
a program running onboard the mobile terminal requests information from an authentication device,
  wherein the requested information is selected from the group consisting of:
    password, one-time-password, certificate, response to a challenge question, challenge authentication results, biometric reading, biometric authentication results, motion information, acceleration information,
  wherein after receipt of a wireless response from said authentication device,
    said program authenticates said wireless response, and after successful authentication, said operation is authorized.

7. The method of claim 1 comprising:
after the mobile terminal leaves a predefined zone,
  a program onboard the mobile terminal sends an indication to an authentication device,
    wherein after the mobile terminal enters a predefined zone,
      a program onboard the mobile terminal sends an indication to an authentication device.

8. The method of claim 1 wherein after the mobile terminal leaves a predefined zone,
  said authentication device monitors proximity to the mobile terminal,
  wherein after detection of loss of proximity,
    said authentication device issues an alarm.

9. A method for securing a mobile terminal comprising:
after detecting loss of Bluetooth proximity from a previously connected authentication device,
  determine the current location of the mobile terminal,
  whereby if the current location is in a predefined zone, lock access to at least one application,
  whereby if the current location is outside a predefined zone, go to an alert mode, wherein when in alert mode the mobile terminal locks access to at least one application,
    wherein after a predetermined period of time, a call is made to a first remote device,
    wherein after a predetermined period of time, a call is made to a second remote device
    wherein the mobile terminal sends at least one email message comprising information about the current location of the mobile terminal, and/or sends at least one a Short Message Service message comprising information about the current location of the mobile terminal,
    wherein after a predetermined period of time, data can be deleted,
  whereby when a previously connected authentication device is detected using Bluetooth protocol, the mobile terminal aborts the alert mode,
  the method further comprises provisioning the authentication device with user data
  wherein said user data is selected from the group consisting of:
    password, One-time-password, certificate, response to a challenge question, challenge authentication results, biometric reading, biometric authentication results, motion information, acceleration information, interface ID, encryption protocol, obfuscation protocol.

10. A method for securing a mobile terminal comprising:
after detecting loss of proximity from a previously connected short wireless authentication device,
  determine the current location of the mobile terminal,
whereby if the current location is in a predefined zone, lock access to at least one application,
whereby if the current location is outside a predefined zone, go to an alert mode, wherein when in alert mode the mobile terminal locks access to at least one application,
  wherein after a predetermined period of time, a call is made to a first remote device,
  wherein after a predetermined period of time, a call is made to a second remote device and
  wherein after a predetermined period of time, the mobile terminal performs an action selected from the group consisting of:
    send an email message comprising information about the current location of the mobile terminal,
    send a Short Message Service message comprising information about the current location of the mobile terminal, wherein after a predetermined period of time, data can be deleted;

whereby when a short wireless authentication device is detected, the mobile terminal aborts the alert mode;

whereby after a request for access onboard thethe mobile terminal if a first authentication device is not connected to the mobile terminal using a short wireless connection, and a second authentication mobile phone is not connected to the mobile terminal using a short wireless connection, access is locked, whereby if a first authentication device is connected to the mobile terminal using a short wireless connection, or if a second authentication mobile phone is connected to the mobile terminal using a short wireless connection, information is requested from a connected device, whereby after receipt of a wireless response from the connected device, and after successful authentication, access is authorized.

11. The system of claim 10 wherein:
said short wireless authentication device is selected from the group consisting of:
BLUETOOTH Low Energy device, BLUETOOTH device, ANT device, NFC device and Wifi device.

12. The system of claim 10 wherein:
said second authentication mobile phone runs a soft token application.

13. The system of claim 10 wherein
after presenting a challenge question on the mobile terminal wherein said challenge question is different from a previously presented challenge question,
sending a code corresponding to the presented challenge question to the connected device,
wherein after a user enters a response onboard the connected device,
a program evaluates said response,
and after successful authentication, said user is authorized,
wherein said response is selected from the group consisting of:
voice response, finger print, finger scan, iris scan, and photo.

14. The system of claim 10 wherein:
said first authentication device comprises a chipset selected from the group consisting of:
an Apple authentication chipset, an AES 256 crypto chipset, a Secure Element chipset, an accelerometer chipset.

15. The system of claim 10 wherein:
after the mobile terminal sends a message digest wirelessly to said first authentication device,
said first authentication device encrypts said message digest using a private key,
said first authentication device sends a signed message digest to the mobile terminal wirelessly.

16. The system of claim 10 comprising:
if the current location of the mobile terminal is in a predefine zone, said program does not issue an audible alert.

17. The system of claim 10 comprising:
said first authentication device obtains motion information from an onboard motion detection means,
if motion is detected, said first authentication device does not respond to requests.

18. The system of claim 10 wherein:
after pairing, said first authentication device changes to non discoverable.

19. The system of claim 10 wherein:
access is only authorized if both said first authentication device and said second authentication mobile phone are connected to the mobile terminal using short range wireless communication and both of them respond to requests.

20. The system of claim 10 wherein:
said first authentication device is unitary, does not have a cellular transceiver and monitors proximity of the mobile terminal in real-time.

* * * * *